United States Patent
Lee et al.

(10) Patent No.: US 11,945,916 B2
(45) Date of Patent: Apr. 2, 2024

(54) OLEOGEL BASED ON FATTY ACID AMIDE-CONTAINING POLYMER AND PREPARATION METHOD THEREFOR

(71) Applicant: POSTECH RESEARCH AND BUSINESS DEVELOPMENT FOUNDATION, Pohang-Si (KR)

(72) Inventors: Sang Joon Lee, Pohang-si (KR); Jae Hyeon Lee, Suwon-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 44 days.

(21) Appl. No.: 17/780,687

(22) PCT Filed: Dec. 4, 2020

(86) PCT No.: PCT/KR2020/017672
§ 371 (c)(1),
(2) Date: May 27, 2022

(87) PCT Pub. No.: WO2021/112628
PCT Pub. Date: Jun. 10, 2021

(65) Prior Publication Data
US 2023/0037110 A1  Feb. 2, 2023

(30) Foreign Application Priority Data
Dec. 4, 2019 (KR) .......... 10-2019-0160132

(51) Int. Cl.
C08G 77/388 (2006.01)
C08G 77/20 (2006.01)
(Continued)

(52) U.S. Cl.
CPC .......... *C08G 77/388* (2013.01); *C08G 77/20* (2013.01); *C08J 3/11* (2013.01); *C08J 3/24* (2013.01);
(Continued)

(58) Field of Classification Search
CPC .......... C08G 77/388; C08G 77/20; C08J 3/11; C08J 3/24; C08J 2383/08; C09D 5/02;
(Continued)

(56) References Cited

U.S. PATENT DOCUMENTS

2015/0152270 A1 * 6/2015 Aizenberg ............ A61L 31/06
                                                  508/106
2015/0232782 A1 * 8/2015 Fisher ............... C10M 169/042
                                                  508/208
(Continued)

FOREIGN PATENT DOCUMENTS

KR   2001-0052973   6/2001
KR   2015-0003395   1/2015
(Continued)

OTHER PUBLICATIONS

Siddarth Srinivasan et al., "Drag reduction for viscous laminar flow on spray-coated non-wetting surfaces", Soft Matter, Apr. 25, 2013, DOI: 10.1039/c3sm50445j.
(Continued)

*Primary Examiner* — Ellen M McAvoy
(74) *Attorney, Agent, or Firm* — LEX IP MEISTER, PLLC

(57) ABSTRACT

The present invention relates to a fatty acid amide-based oleogel containing polymer and a method for preparing same and, more particularly, to a fatty acid amide-based oleogel containing polymer and a method for preparing same, the oleogel comprising: a substrate formed of a polymer of a fatty acid amide having a single double bond
(Continued)

and a silicone polymer, or a composition comprising same; and an oleogel surface formed by impregnating the substrate with oil, wherein, in the silicone polymer, first silyl-terminated polydialkylsiloxane is crosslinked with second vinyl-terminated polydialkylsiloxane, and the fatty acid amide is linked to the first silyl-terminated polydialkylsiloxane. Also, the present invention can provide use of the fatty acid amide-based oleogel containing polymer according to the present invention.

15 Claims, 12 Drawing Sheets

(51) Int. Cl.
| | |
|---|---|
| C08J 3/11 | (2006.01) |
| C08J 3/24 | (2006.01) |
| C09D 5/02 | (2006.01) |
| C09D 5/16 | (2006.01) |
| C09D 183/08 | (2006.01) |
| C10M 107/50 | (2006.01) |
| C10N 50/00 | (2006.01) |

(52) U.S. Cl.
CPC ............. *C09D 5/02* (2013.01); *C09D 5/1675* (2013.01); *C09D 183/08* (2013.01); *C10M 107/50* (2013.01); *C08J 2383/08* (2013.01); *C10M 2229/0525* (2013.01); *C10N 2050/01* (2020.05)

(58) Field of Classification Search
CPC .. C09D 5/1675; C09D 183/08; C10M 107/50; C10M 2229/0525; C10N 2050/01
See application file for complete search history.

(56) References Cited

U.S. PATENT DOCUMENTS

| | | | |
|---|---|---|---|
| 2018/0002353 A1* | 1/2018 | Gutacker | ............... C08K 5/544 |
| 2023/0037110 A1* | 2/2023 | Lee | ........... C09D 7/65 |

FOREIGN PATENT DOCUMENTS

| | | |
|---|---|---|
| KR | 2015-0143486 | 12/2015 |
| KR | 2019-0085995 | 7/2019 |

OTHER PUBLICATIONS

Tak-Sing Wong et al., "Bioinspired self-repairing slippery surfaces with pressure-stable omniphobicity", Macmillan Nature, Sep. 22, 2011, doi:10.1038/nature10447.

Lin Zhu et al., "Ice-phobic Coatings Based on Silicon-Oil-Infused Polydimethylsiloxane", ACS Applied Materials & Interfaces. Apr. 22, 2013, vol. 5, pp. 4053-4062.

* cited by examiner

OLEOGEL BASED ON FATTY ACID AMIDE-CONTAINING POLYMER AND PREPARATION METHOD THEREFOR

TECHNICAL FIELD

The following description relates to a fatty acid amide-based oleogel containing polymer and a method for preparing the same.

BACKGROUND ART

Wetting to liquids is used as a basic principle in various fields such as drag reduction on the surface of a ship, anti-icing in low-temperature conditions, and antibiofouling against underwater creatures. The existing Cassie/Wenzel state micro/nano-structured superhydrophobic surfaces have obtained super-water repellent performance by reducing surface energy and improving surface roughness. However, these superhydrophobic surfaces have a durability problem of having a short lifespan due to low durability caused by abrasion, which causes difficulties in practical application. Further, in the Cassie state, it is very difficult to produce a surface that repulses liquids with low surface energy such as organic liquids and alcohols due to the low surface energy and polarity of the liquids themselves.

In order to solve these problems, a liquid-infused surface (LIS) was introduced by obtaining an inspiration from fish skin's anti-wetting properties against oil droplets and the insectivorous plant Nepenthes. This LIS technology has good properties in sliding and repulsing against liquids having different polarities by infusing a liquid into the porous solid surface. Unlike superhydrophobic surfaces in the Cassie state, the liquid layer injected into the LIS surface separates the solid surface from the external working liquid by preventing direct contact between the solid surface and the external liquid. However, there is a problem in that the liquid impregnated into the porous solid surface is easily lost by external pressure and shear flows. Accordingly, the convention LIS surface easily loses its water-repellent properties depending on the external environment, and thus has a disadvantage in that the persistence of low-friction performance is low. Further, the LIS is difficult to industrially apply, since the manufacturing process is complicated and it is difficult to scale-up for practical application. Further, there is a problem in that the liquid infused into the LIS surface is easily lost due to an external environment such as shear flow and high pressure so that the durability of the slippage properties is low.

DISCLOSURE OF THE INVENTION

Technical Goals

The present invention is to solve the above problems, and an aspect of the present invention provides a fatty acid amide-based oleogel containing polymer, which has high slippage properties, can sustain these properties for a long time, and can simultaneously exhibit excellent anti-icing, waterproof and antibiofouling performance along with high drag reduction by impregnating a liquid inside a solid polymer network, unlike the convention LIS surface, thereby forming an oleogel.

Another aspect of the present invention provides a method for preparing a fatty acid amide-based oleogel containing polymer according to the present invention in an inexpensive and simple process.

Another aspect of the present invention provides a coating including a fatty acid amide-based oleogel containing polymer according to the present invention.

Another aspect of the present invention provides a product including the fatty acid amide-based oleogel containing polymer according to the present invention or the coating according to the present invention.

However, the problems to be solved by the present invention are not limited to the problems mentioned above, and other problems not mentioned will be clearly understood by those skilled in the art from the following description.

Technical Solutions

According to an aspect of the present invention, there is provided a fatty acid amide-based oleogel containing polymer, the oleogel including: a matrix formed of a polymer of a fatty acid amide having one double bond represented by Chemical Formula 1 below and a silicone polymer, or a composition including the polymer; and an oleogel surface formed by impregnating a lubricating oil into the matrix, in which the silicone polymer includes: a first polydialkylsiloxane terminated with a silyl group; and a second polydialkylsiloxane terminated with a vinyl group which are crosslinked, and the fatty acid amide is linked to the first polydialkylsiloxane terminated with the silyl group.

[Chemical Formula 1]

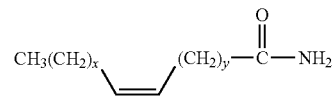

(where, X and Y are each selected from 1 to 100.)

According to an example embodiment of the present invention, the oil may be one which is impregnated into the surface of the matrix, inside the matrix, or both thereof.

According to an example embodiment of the present invention, the oil may be impregnated in an amount of 1% by weight to 200% by weight based on the polymer of the fatty acid amide and the silicone polymer.

According to an example embodiment of the present invention, the fatty acid amide may be linked by hydrosilylation between the silicon hydride of the first polydialkylsiloxane and the double bond of the fatty acid amide.

According to an example embodiment of the present invention, the silicone polymers may be linked to each other by hydrosilylation between the silicon hydride of the first polydialkylsiloxane and the vinyl group of the second polydialkylsiloxane.

According to an example embodiment of the present invention, in the first polydialkylsiloxane and the second polydialkylsiloxane, a silicone atom of the siloxane may be substituted with an alkyl group having 1 to 5 carbon atoms.

According to an example embodiment of the present invention, the first polydialkylsiloxane and the second polydialkylsiloxane may be polydimethylsiloxane.

According to an example embodiment of the present invention, the silicone polymer and the fatty acid amide may have a polymerization ratio (w/w) in the range of 5:1 to 100:1.

According to an example embodiment of the present invention, the matrix may be in a form of film, sheet, or coating, and the matrix may be a slippery oleogel surface formed by impregnation with the oil.

According to an example embodiment of the present invention, the oil may include silicone oil, petroleum, or both thereof, and petroleum may include one or more selected from a group consisting of crude oil, gasoline, diesel, and n-alkanes.

According to another aspect of the present invention, there is provided a method for preparing a fatty acid amide-based oleogel containing polymer, the method including the steps of: forming a matrix of a polymer of a fatty acid amide having one double bond represented by Chemical Formula 1 below and a silicone polymer, or a composition including the polymer; and forming an oleogel by impregnating a lubricating oil into the matrix, in which the silicone polymer includes: a first polydialkylsiloxane terminated with a silyl group; and a second polydialkylsiloxane terminated with a vinyl group which are crosslinked, and the fatty acid amide is linked to the first polydialkylsiloxane terminated with the silyl group.

[Chemical Formula 1]

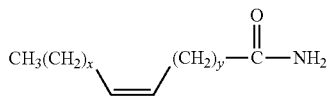

(where, X and Y are each selected from 1 to 100.)

According to an example embodiment of the present invention, the polymer comprised of the fatty acid amide and silicone polymer may be one which is obtained by polymerizing: a fatty acid amide having one double bond represented by Chemical Formula 1 above; a first polydialkylsiloxane terminated with a silyl group; and a second polydialkylsiloxane terminated with a vinyl group under the presence of a catalyst.

According to an example embodiment of the present invention, the method may further include a step of drying the matrix before the step of forming the oleogel.

According to an example embodiment of the present invention, the drying step may be performed at a temperature of room temperature (20° C.) to 70° C.

According to another aspect of the present invention, there is provided a coating including the fatty acid amide-based oleogel containing polymer according to the present invention.

According to an example embodiment of the present invention, the coating may have an oleogel surface layer having slippage properties, and the coating may have waterproof and oilproof performance.

According to an example embodiment of the present invention, the coating may have anti-icing and de-icing performance.

According to an example embodiment of the present invention, the coating may have antibiofouling performance, friction drag reduction, and self-healing performance.

According to another aspect of the present invention, there is provided a product including the fatty acid amide-based oleogel containing polymer according to the present invention or the coating according to the present invention.

According to an example embodiment of the present invention, the product may be a ship's outer plate or inner plate part, or an offshore plant part.

According to an example embodiment of the present invention, the product may be parts of a home appliance or medical device.

Advantageous Effects

The present invention can provide a fatty acid amide polymer-based oleogel surface that not only has slippage properties, but also has low friction, anti-icing, and antibiofouling properties, and can provide a functional surface technology by the oleogel surface using a simple process and low-cost materials. Further, the present invention enables the production of a surface having slippage properties of a large area that can be industrially applied, and prevents the liquid impregnated in the surface from being lost to last low friction properties for a long time so that the replacement and maintenance cost of the surface can also be reduced. Further, it is possible to provide a functional surface with anti-icing and antibiofouling performance along with efficient drag reduction.

When the fatty acid amide polymer-based oleogel according to the present invention is used, it is possible to greatly reduce the use of the fuel cost required for vehicle operation by providing innovative drag reduction performance along with slippage properties and antibiofouling performance against underwater creatures to the surface of a marine vehicle, and it is possible to increase the heat transfer efficiency and reduce the electricity usage fee by preventing the freezing of an aircraft and the freezing of a home appliance such as a refrigerator by using an anti-icing technology of preventing the formation of frost.

BEST MODE FOR CARRYING OUT THE INVENTION

Figure 1A:
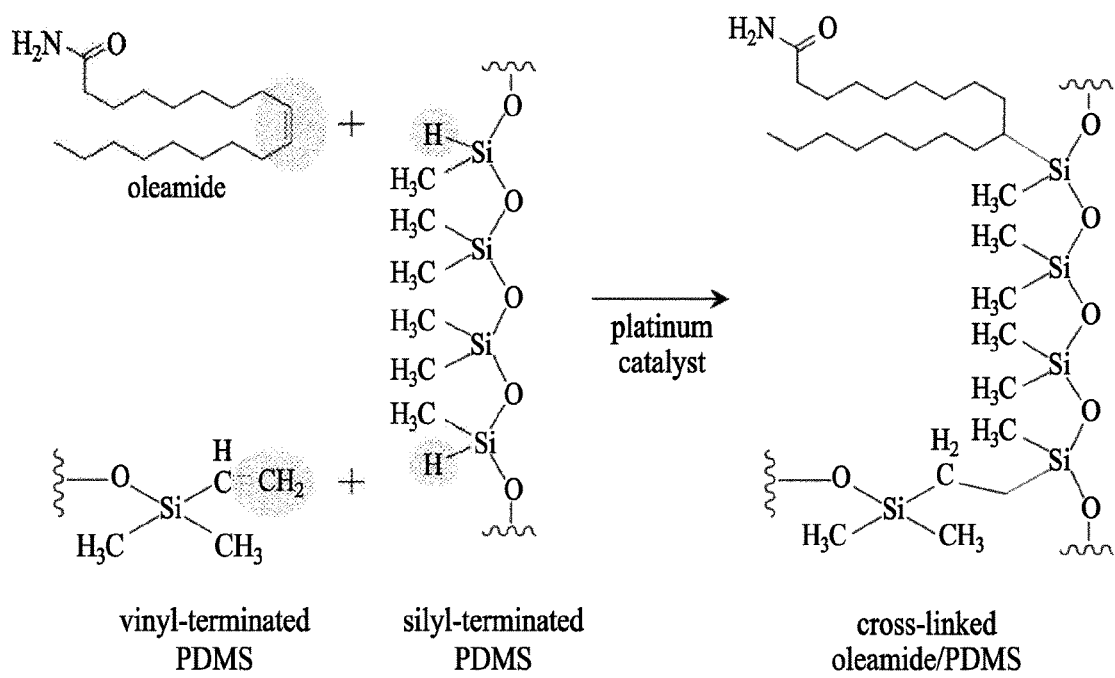
FIG. 1A, according to an example embodiment of the present invention, exemplarily shows a process for preparing a fatty acid amide-based oleogel containing polymer according to the present invention, and shows a polymerization process of the fatty acid amide-containing polymer.

Hereinafter, example embodiments of the present invention will be described in detail with reference to the accompanying drawings. In describing the present invention, if it is determined that a detailed description of a related well-known function or configuration may unnecessarily obscure the gist of the present invention, the detailed description thereof will be omitted. Also, terms used in the present specification, as terms which are used so as to appropriately describe a preferred example embodiment of the present invention, may be changed depending on the user's or operator's intention or the practices of the field to which the present invention pertains. Therefore, the definitions of the terms should be made based on the contents throughout the present specification. The same reference numerals disclosed in each drawing represent the same members.

In the whole specification, when any member is positioned "on" the other member, this not only includes a case that the any member is brought into contact with the other member, but also includes a case that another member exists between two members.

In the whole specification, if a prescribed part "includes" a prescribed element, this means that another element can be further included instead of excluding another element.

Hereinafter, the present invention will be described in detail with reference to example embodiments and drawings. However, the present invention is not limited to such example embodiments and drawings.

The present invention relates to a fatty acid amide-based oleogel containing polymer. According to an example embodiment of the present invention, an oleogel, for example, an oleogel surface is formed by impregnating oil into a matrix, which includes a fatty acid amide-containing polymer or is formed of a composition including the fatty acid amide-containing polymer. That is, in the oleogel, oil molecules are impregnated between molecular networks of a fatty acid amide and a silicone polymer so that drag reduction performance higher than that of an existing liquid-infused surface (LIS) may be shown, and the impregnated oil molecules are not lost to the outside so that persistence having high low-friction performance may be shown. Further, since, due to its low surface energy, the oleogel suppresses the formation of frost generated on the solid surface in an environment with a very low temperature, for example, inside a refrigerator, excellent anti-icing performance and low surface energy of the oleogel are combined with antibiofouling performance of the fatty acid amide itself so that very high antibiofouling performance may be exhibited.

According to an example embodiment of the present invention, the fatty acid amide-containing polymer is a novel polymer having low friction and antibiofouling performance by chemically bonding the silicone polymer and the fatty acid amide.

In an example embodiment of the present invention, the fatty acid amide may include an oleamide containing at least one double bond, and preferably include at least one of the compounds represented by Chemical Formula 1 below. The fatty acid amide may be polymerized with the silicone polymer to provide a polymer having a drag reducing effect, and antibacterial and antibiofouling functionalities. For example, it may be possible to provide a polymer that inhibits the adhesion and proliferation of microorganisms such as *Escherichia coli* or inhibits the spore adhesion and proliferation of algae growing in a sea environment, depending on the application field, and has an improved drag reduction effect under a flow condition by controlling the type of a silicone polymer to be polymerized with oleamide, polymerization reaction temperature, polymerization time, polymerization rate, etc.

[Chemical Formula 1]

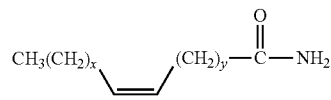

where, X and Y may each be an integer selected from 1 to 100, preferably 2 to 30, or 2 to 20.

In an example embodiment of the present invention, the silicone polymer may include a first polydialkylsiloxane terminated with a silyl group; and a second polydialkylsiloxane terminated with a vinyl group which are crosslinked, and it may be possible to form a polymer in which the first polydialkylsiloxane, the second polydialkylsiloxane, and the fatty acid amide are polymerized together in the presence of a catalyst so that they are linked to each other.

Figure 1B:
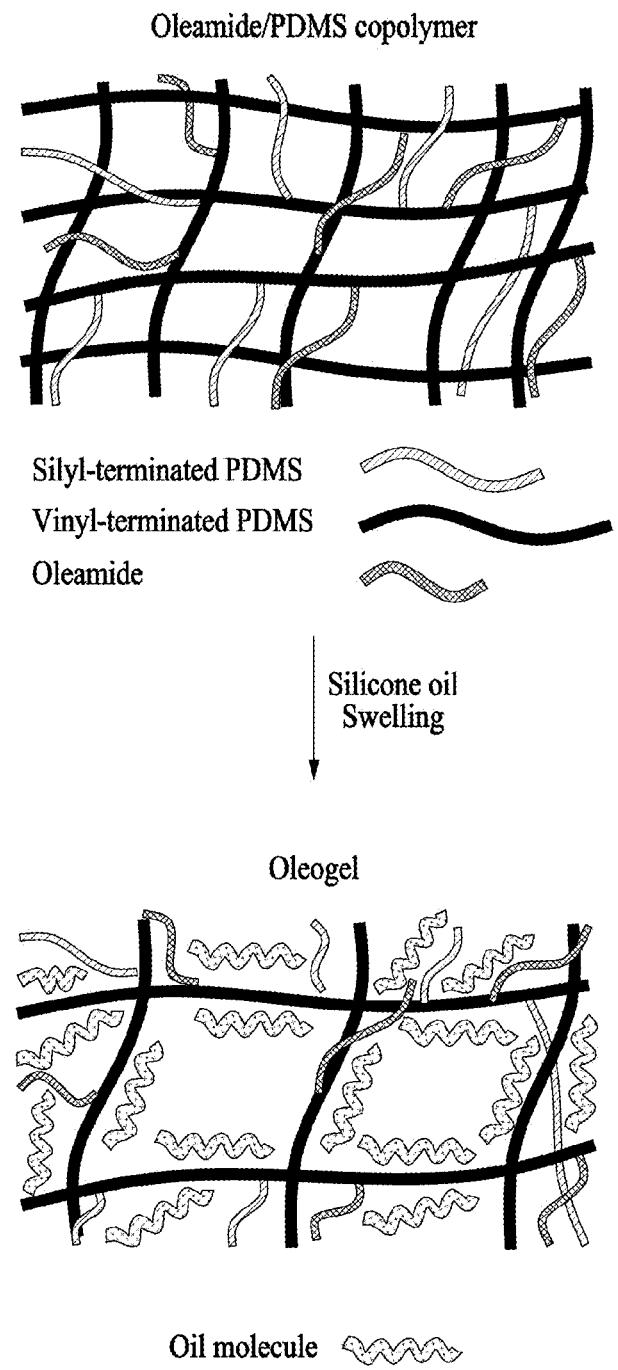
FIG. 1B, according to an example embodiment of the present invention, exemplarily shows the process for preparing a fatty acid amide-based oleogel containing polymer according to the present invention, and shows a process for forming an oleogel surface through oil impregnation within a network of the polymer.

Referring to FIGS. 1A and 1B, the fatty acid amide is one which enables polymerization with a polymer having a different double bond site, and is linked to the first polydialkylsiloxane terminated with the silyl group. That is, the fatty acid amide may be polymerized with the silicone polymer by being linked by hydrosilylation between the double bond of the fatty acid amide and a silicone hydride at the end of the silyl group of the first polydialkylsiloxane. Furthermore, the silicone polymer may be polymerized by being linked to each other through hydrosilylation between the silicone hydride at the end of the silyl group of the first polydialkylsiloxane and the vinyl group of the second polydialkylsiloxane.

The first polydialkylsiloxane and the second polydialkylsiloxane may each be one in which an alkyl group having 1 to 10, 1 to 5, or 1 to 2 carbon atoms is substituted with a silicon atom in the siloxane structure, and may preferably be polydimethylsiloxane (PDMS).

The first polydialkylsiloxane and the second polydialkylsiloxane may each have a molecular weight (weight average or number average molecular weight) selected from 500 to 180,000. For example, the first polydialkylsiloxane may have an Mn selected from 500 to 110,000, and the second polydialkylsiloxane may have an Mw selected from 20,000 to 100,000.

In an example embodiment of the present invention, the fatty acid amide-containing polymer may include a step of polymerizing a fatty acid amide having one double bond represented by Chemical Formula 1 above, a first polydialkylsiloxane terminated with a silyl group; and a first polydialkylsiloxane terminated with a vinyl group under the presence of a catalyst.

In the polymerization step, polymerization may be performed at a temperature of room temperature (20° C.) to 70° C. under a platinum catalyst.

The polymerization ratio of the silicone polymer to the fatty acid amide may be 5:1 to 160:1 (w:w); 10:1 to 100:1 (w:w), or 5:1 to 100:1 (w:w), and this polymerization ratio can be adjusted so that the antibiofouling effect, for example, the antibacterial, marine organism proliferation and adhesion effects (i.e., anti-adhesion and proliferation inhibitory effects), and the friction drag reduction effect may be controlled. Furthermore, the effects may be controlled by temperature and time of the drying process (or hardening process) of the polymer.

The ratio of the first polydialkylsiloxane (silyl-terminated) to the first polydialkylsiloxane (vinyl-terminated) may be 1:10 to 1:20 (w:w).

More specifically, when the amount of a fatty acid amide added during polymerization is a specific ratio or more, it exhibits stronger hydrophilicity than the first polydialkylsiloxane, and thus the specific ratio or more amount of the fatty acid amide may increase the antibacterial effect, and may cause differences in adhesion properties of *Escherichia coli*, marine organisms, etc. attached to the surface by appropriate elasticity. Further, when the first polydialkylsiloxane and the fatty acid amide are polymerized at a specific ratio, the result of inhibiting the proliferation of *Escherichia coli* may be exhibited, and the effect of preventing adhesion of marine organisms and *Escherichia coli* and the effect of inhibiting the proliferation thereof may be further adjusted depending on the temperature and time of the drying process (e.g., the hardening process) of the polymer.

In an example embodiment of the present invention, the composition including the fatty acid amide-containing polymer may be a functional composition having a low friction function and an antibiofouling function by drag reduction, and may be, for example, an eco-friendly paint composition. The composition may further include an appropriate solvent and additives depending on the application field, but the present specification does not specifically mention it.

In an example embodiment of the present invention, the matrix may be a solid formed of a fatty acid amide-containing polymer or a composition including the fatty acid amide-containing polymer, and may be, more specifically, particles, a structure, a film, a sheet, a coating film, a coating, and the like.

In an example embodiment of the present invention, the oil is an oil having a lubricating function, and may be impregnated into the surface, inside, or both of the matrix to form an oleogel, for example, a slippery oleogel surface. That is, the oil may provide a surface that can simultaneously exhibit the slippage properties of the oleogel surface and the antibiofouling performance of the fatty acid amide polymer. Further, due to the low price and the simple manufacturing process by impregnation, the oil may provide a surface which exhibits high slippage properties compared to the existing liquid-infused surface (LIS), effectively reduces drag caused by external flow, and has anti-icing and de-icing performance at a place of low temperatures and antibiofouling performance in a marine environment.

The oil may be impregnated in an amount of 1% by weight to 200% by weight with respect to the polymer comprised of the fatty acid amide and silicone polymer, and when the amount is included within the above range, the oil may provide an oleogel that not only has excellent slippage properties, but also can be maintained for a long period of time.

The oil may include a silicone oil, a hydrocarbon-based oil, or both thereof, and the hydrocarbon-based oil may be a petroleum oil, a synthetic oil, an animal oil, a vegetable oil, or the like.

The petroleum oil may be crude oil, mineral oil, gasoline, diesel, and n-alkanes, but is not limited thereto. The n-alkanes may contain 5 or more carbon atoms; 8 or more carbon atoms; or 8 to 30 carbon atoms.

The synthetic oil may be polyalphaolefin, fatty acid ester, hydrogenated polydecene, synthetic squalane, polybutene, or the like, but is not limited thereto.

The present invention relates to a preparation method of a fatty acid amide-based oleogel containing polymer according to the present invention. According to an example embodiment of the present invention, the preparation method may easily prepare an oleogel surface in which oil is impregnated into a material having a fatty acid amide and a silicone polymer polymerized therein, and the oleogel surface is used so that the preparation method may not only provide high slippage properties, high drag reduction performance, antibiofouling performance, anti-icing performance, and de-icing performance with respect to liquids, but also enable the oleogel surface to be stably maintained for a long time.

According to an example embodiment of the present invention, the preparation method may include the steps of: forming a matrix of a polymer of a fatty acid amide having one double bond represented by Chemical Formula 1 below and a silicone polymer, or a composition including the polymer; and impregnating the matrix with oil to form an oleogel.

In an example embodiment of the present invention, the step of forming the matrix may include a step of polymerizing a fatty acid amide having one double bond represented by Chemical Formula 1 above, a first polydialkylsiloxane terminated with a silyl group; and a second polydialkylsiloxane terminated with a vinyl group under the presence of a catalyst, or preparing a composition including the polymer of the fatty acid amide and the silicone polymer. Further, the polymer of the fatty acid amide and the silicone polymer or the composition including the same may be subjected to a polymer molding process such as coating, or extrusion to form a solid matrix.

In an example embodiment of the present invention, a step of drying the matrix before the step of forming the oleogel may be further included, and the step of drying the matrix may correspond to a hardening process of removing a solvent or the residuals remained in the polymer.

The drying step may be performed at a temperature of room temperature (20° C.) to 70° C.

The step of impregnating the matrix with oil to form an oleogel is forming an oleogel surface by infusing the oil into the surface of a solid matrix in which the fatty acid amide and the silicone polymer are crosslinked by the impregnation process of an oil, which may provide a surface having high slippage properties in a low price and simple manufacturing process compared to the existing liquid-infused surface (LIS). The oil is an oil having a lubricating function, and is the same as described above.

In the present invention, the fatty acid amide-based oleogel containing polymer according to the present invention may be used in a form of paint, a functional coating film, a surface forming technology, a coating, a surface treatment technology, and a water collection and recovery technology for providing excellent anti-icing and antibiofouling properties along with high drag reduction. For example, it may be applied to a ship or marine transport vehicle, an offshore structure, an aircraft, a home appliance, a water storage device and container, and a medical device, and the like. More specifically, it will be used as a surface treatment technology for marine vehicles transport ships, offshore plants and offshore oil fields, water tanks, water purifiers, aircraft, humidifiers, aircraft, refrigerators, and the like.

For example, the oleogel may be used in antibiofouling paints that reduce the drag applied to the surface of ships, offshore structures, or objects, and prevent the adhesion of underwater creatures, and may be used as an anti-icing technology that prevents the formation of frost in a low-temperature environment and a surface treatment technology that prevents them from being stuck to the surface by using its slippage properties for droplets or liquids. Furthermore, it may be used for preventing frost and icing on the surface of airplanes or home appliances such as refrigerators, or as a low-friction antibiofouling surface treatment technology of medical devices.

For example, it may be used as surface treatment technology and coating for a lubricating surface with slippage properties for droplets, low friction to reduce drag caused by flow, and anti-icing and de-icing to suppress the formation of frost at low temperatures.

For example, a coating including the fatty acid amide-based oleogel containing polymer may be used as an oleogel surface layer having slippage properties and a functional coating having antibiofouling performance, friction drag reduction, and self-healing performance of the fatty acid amide, and the coating may further exhibit waterproof, oilproof, anti-icing and de-icing performance.

For example, it may be used as surface technology and coating that enable self-healing of a surface damaged by an external force, a high pressure condition, or the like using a polymer network of the oleogel.

For example, it may be used as a technology of collecting and recovering water from fog and dew by condensing water vapor in the atmosphere.

The present invention relates to a product including the fatty acid amide-based oleogel containing polymer according to the present invention, which has a paint, a functional coating film, a surface forming technology, a coating, a surface treatment technology, and the like applied thereto. For example, it may be a ship or marine transport vehicle, an offshore structure, an aircraft, a home appliance, a water storage device and container, a medical device, and the like. More specifically, it may be ship's outer plate and inner plate parts, offshore plant and oil field parts, aircraft parts, home appliance parts, medical device parts, and the like.

Hereinafter, the present invention will be described in more detail by Examples and Comparative Example.

However, the following Examples are only for illustrating the present invention, and the content of the present invention is not limited to the following Examples.

EXAMPLE

Preparation of Oleogel Based on Fatty Acid Amide-Containing Polymer

As shown in FIGS. 1A and 1B, an oleamide/PDMS surface in which oleamide as a fatty acid amide and polydimethylsiloxane (PDMS) as silicone were polymerized and crosslinked with each other was prepared in order to prepare a fatty acid amide-based oleogel containing polymer.

First, oleamide, which is a solid lubricant, is put into a toluene solution and dissolved into a liquid state through the sonication process. Subsequently, the toluene solution in which oleamide is dissolved and a PDMS solution (a product of Dow Corning, product name SYLGARD 184, vinyl-terminated PDMS and silyl-terminated PDMS are mixed at a ratio of 10:1) are mixed to crosslink oleamide and PDMS with each other. This is because the double bond of an oleamide-containing fatty acid amide and hydrogen of silyl-terminated PDMS are crosslinked with each other so that various fatty acid amides can be polymerized on the same principle. After coating the crosslinked oleamide/PDMS solution on a flat plate, it is put into a vacuum oven at 60° C. to evaporate the toluene solution. A silicone oil was poured on the surface of the prepared oleamide/PDMS to prepare an oleogel surface impregnated with oil.

Experimental Example

Figure 2A:
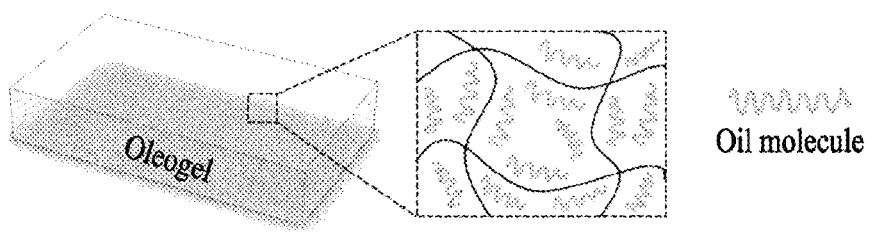
FIG. 2A, according to an example embodiment of the present invention, shows results of evaluating the slip properties of a fatty acid amide-based oleogel containing polymer according to an Example of the present invention.
Figure 2B:
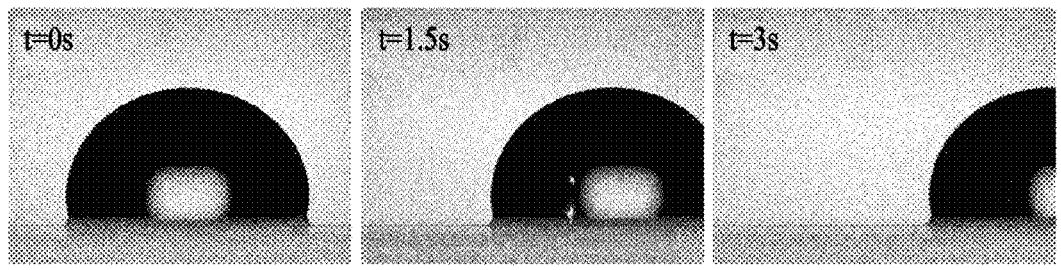
FIG. 2B, according to an example embodiment of the present invention, shows results of evaluating the slip properties of the fatty acid amide-based oleogel containing polymer according to an Example of the present invention.

Evaluation of Slip Properties of Oleogel Based on Fatty Acid Amide-Containing Polymer As shown in FIG. 2A, the fatty acid amide-based oleogel containing polymer is a state in which an oil having lubricant properties is impregnated inside the gel. Accordingly, an oleogel surface based on a fatty acid amide-containing polymer has slippage properties. Due to the slippage properties of such an oleogel, a water droplet of 20 μl in volume that had been lain on an oleogel plane rolls off the oleogel plane at a sliding angle within 1.5 degrees. As shown in FIG. 2B, it may be applied to a technology (fog harvesting, dew harvesting) of condensing water vapor in the atmosphere, such as mist and dew, on the oleogel surface by using the slippage properties of such an oleogel surface, and recovering condensed water using the slippage properties.

Experimental Example 2

Figure 3A:
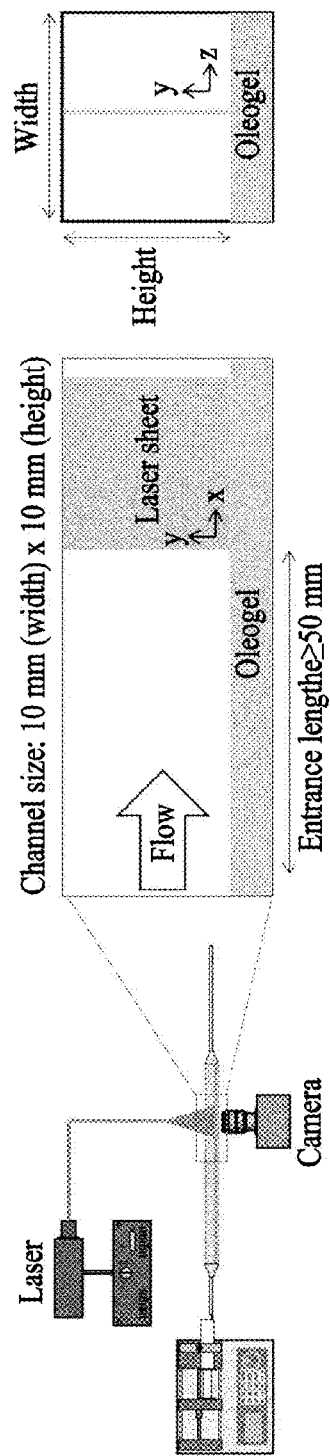
FIG. 3A, according to an example embodiment of the present invention, shows a method for measuring the slip length of the fatty acid amide-based oleogel containing polymer according to an Example of the present invention.
Figure 3B:
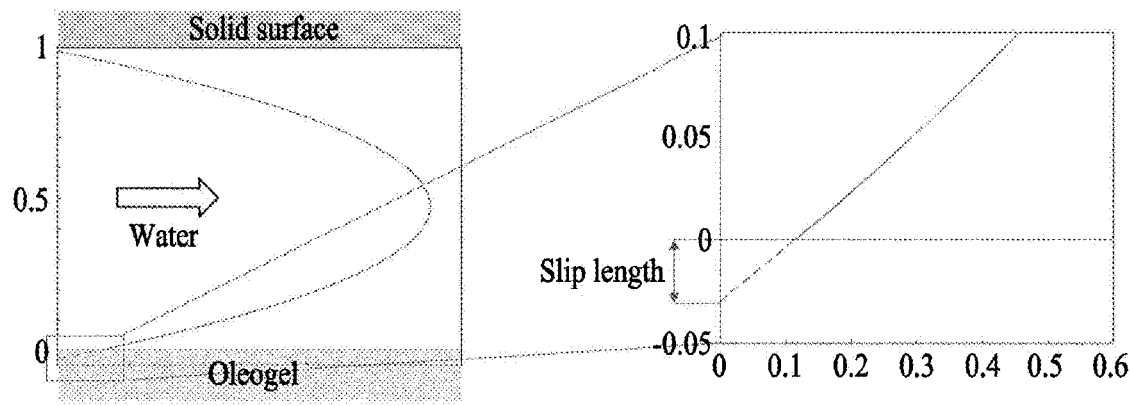
FIG. 3B, according to an example embodiment of the present invention, shows results of measuring the slip length of the fatty acid amide-based oleogel containing polymer according to an Example of the present invention.

Measurement of Slip Length of Oleogel Based on Fatty Acid Amide-Containing Polymer When a fluid moves on a solid surface, the fluid flow receives drag due to the flow rate, turbulence, solid surface roughness, and the like. In particular, the internal flow of the boundary layer causes shear stress. In general, when a fluid flows over a solid surface, a no-slip condition is established at the boundary surface. On the other hand, a slip, which is a non-adhesive phenomenon, occurs in the oleogel. Accordingly, the slip length on the surface of the fatty acid amide-containing polymer was measured. In FIG. 3A, a prepared oleogel surface was positioned on the bottom surface of a microchannel (a width of 10 mm and a height of 10 mm), and a fluid (Reynolds number=50) mixed with tracing particles was flowed into the channel. The velocity field of the flow inside the channel was measured by irradiating a laser sheet to the location where the fluid was fully developed and by applying the particle image velocimetry (PIV) and particle tracking velocimetry (PTV) velocity field measurement techniques. Looking at the velocity distribution according to the normalized height of the channel in FIG. 3B, the wall speed is 0 according to the no-slip condition in the flat solid plane at the top of the channel. On the other hand, a slip phenomenon occurs on the oleogel surface based on a fatty acid amide-containing polymer located at the bottom of the channel, showing an asymmetric velocity distribution. When the slip length is obtained using the Standard Navier boundary condition model for the velocity shape on the oleogel surface in FIG. 3B, it may be calculated that the oleogel surface based on a fatty acid amide-containing polymer has a large slip length of 209.4 μm.

Experimental Example 3

Figure 4A:
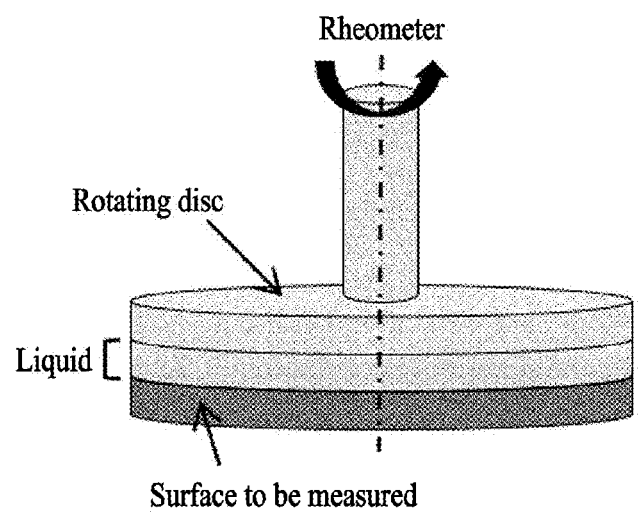
FIG. 4A, according to an example embodiment of the present invention, shows a method for evaluating the persistence of the drag reduction performance and low-friction performance of the fatty acid amide-based oleogel containing polymer according to an Example of the present invention.
Figure 4B:
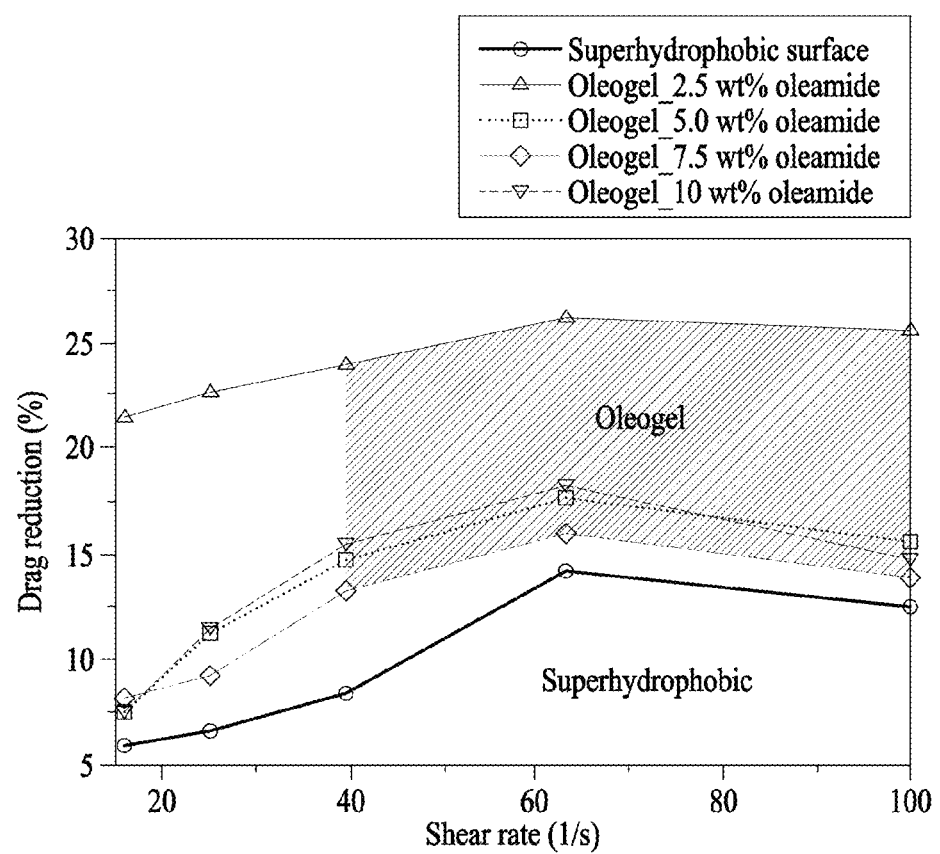
FIG. 4B, according to an example embodiment of the present invention, shows results of evaluating the persistence of the drag reduction performance and low-friction performance of the fatty acid amide-based oleogel containing polymer according to an Example of the present invention.

Persistence Evaluation of Drag Reduction Performance and Low-Friction Performance of Oleogel Based on Fatty Acid Amide-Containing Polymer As shown in FIG. 4A, the drag reduction performance of a fatty acid amide-based oleogel was measured using rheometer equipment. A surface to be measured was positioned at the bottom of the rheometer, and a glycerol solution was filled in a 1,500 μm gap between a rotating plate with a diameter of 20 mm located at the top and the surface to be measured. In order to accurately measure the drag, the zero-gap condition was satisfied, and meniscuses of water were vertically formed at the edges. First, viscosity values of glycerol according to changes in the shear rate (10 to 100 l/s) of fatty acid amide polymer-based oleogel surfaces prepared by variously changing the weight percent (% by weight) of oleamide were measured by using a flat glass, a superhydrophobic surface with a contact angle of 150.6°, and a PDMS surface as a control group. And, the drag reduction performance was calculated by dividing the viscosity values measured on the oleogel surface and the superhydrophobic surface by the viscosity values measured on the flat glass, and the results are shown in FIG. 4B.

Figure 4C:
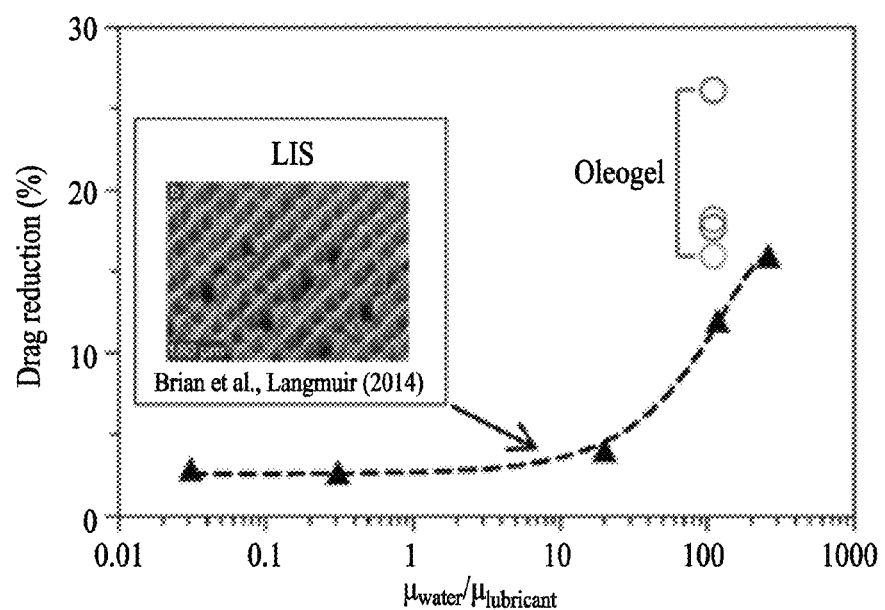
FIG. 4C, according to an example embodiment of the present invention, shows results of evaluating the persistence of the drag reduction performance and low-friction performance of the fatty acid amide-based oleogel containing polymer according to an Example of the present invention.

All fatty acid amide-based oleogel surfaces measured with a rheometer in a shear rate range of 40 or more showed higher drag reduction performance than the superhydrophobic surface. The oleogel surface based on a fatty acid amide-containing polymer prepared with 2.5% by weight of oleamide showed a high drag reduction performance of 26.1%. According to the viscous dissipation theory of the lubricant itself used in the liquid-infused surface (LIS) in FIG. 4C, the drag reduction performance is proportional to the ratio of the viscosity value ($\mu_{water}$) of the fluid flowing over the surface to the viscosity value ($\mu_{lubricant}$) of the lubricant impregnated into the surface. Accordingly, the drag reduction performance of the oleogel was compared with the conventional LIS for drag reduction (Brian et al., Langmuir, 2014) at the place where the viscosity of the flowing fluid had the same ratio as the viscosity of the lubricant.

Figure 4D:
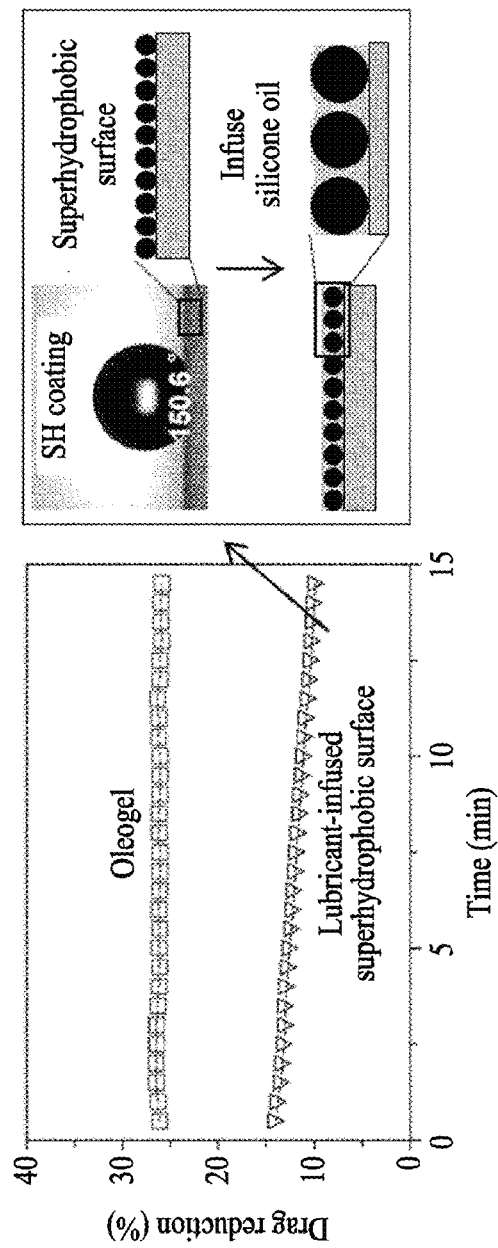
FIG. 4D, according to an example embodiment of the present invention, shows results of evaluating the persistence of the drag reduction performance and low-friction performance of the fatty acid amide-based oleogel containing polymer according to an Example of the present invention.

The fatty acid amide-based oleogel surfaces prepared in FIG. 4D showed much higher drag reduction performance than the conventional LIS. Further, the persistence (durability) of the low-friction performance of the fatty acid amide-based oleogel was evaluated. A liquid-infused superhydrophobic surface similar to the convention LISs was compared as a control group by coating silicone oil on a superhydrophobic surface having a contact angle of 150.6°. While the low-friction performance of the LIS continuously decreased according to time, the low-friction performance of the fatty acid amide-based oleogel containing polymer remained constant, showing high durability of the low-friction performance. Further, the polymer network impregnated with oil molecules of the oleogel enables self-healing through rapid diffusion of the polymer when the surface is damaged by an external fluid and force.

Experimental Example 4

Figure 5A:
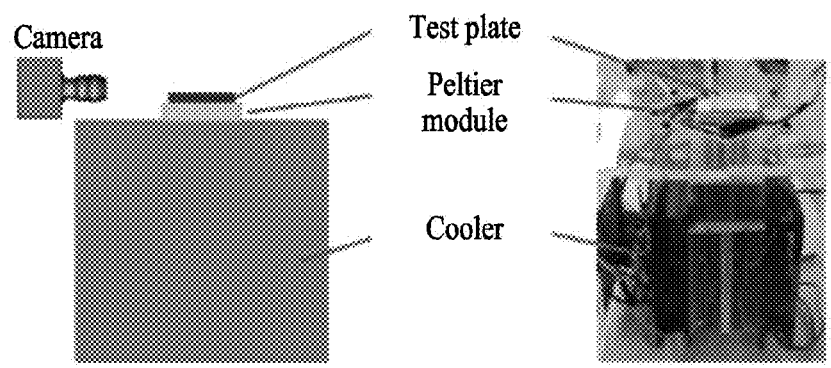
FIG. 5A, according to an example embodiment of the present invention, shows a method for evaluating the anti-icing and de-icing performance of the fatty acid amide-based oleogel containing polymer according to an Example of the present invention.
Figure 5B:
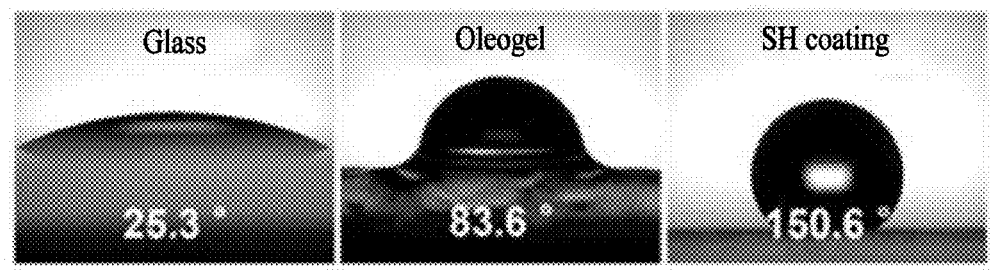
FIG. 5B, according to an example embodiment of the present invention, shows results of evaluating the anti-icing and de-icing performance of the fatty acid amide-based oleogel containing polymer according to an Example of the present invention.

Evaluation of Anti-Icing and De-Icing Performance of Oleogel Based on Fatty Acid Amide-Containing Polymer As shown in FIGS. 5A and 5B, a Peltier device was installed in an environment in which the outside temperature and humidity were maintained in order to evaluate the anti-icing and de-icing performance of the prepared oleogel. After placing respective specimens (a flat glass, a superhydrophobic coating surface (superhydrophobic surface, SH coating), and a fatty acid amide-based oleogel containing polymer) on a Peltier device with a controllable surface temperature and lowering the surface temperature to −15° C., the frosting and freezing processes occurring on the surface were monitored. In order to minimize the experimental error caused by the difference in thermal conductivity of each of the specimens, a glass surface was placed on the specimen surface, and when frost occurred on the glass, the glass was removed, and photographing was taken. Accordingly, the initial surface temperatures of the specimens were made to be the same in the analysis of the frost formation process.

Figure 5C:
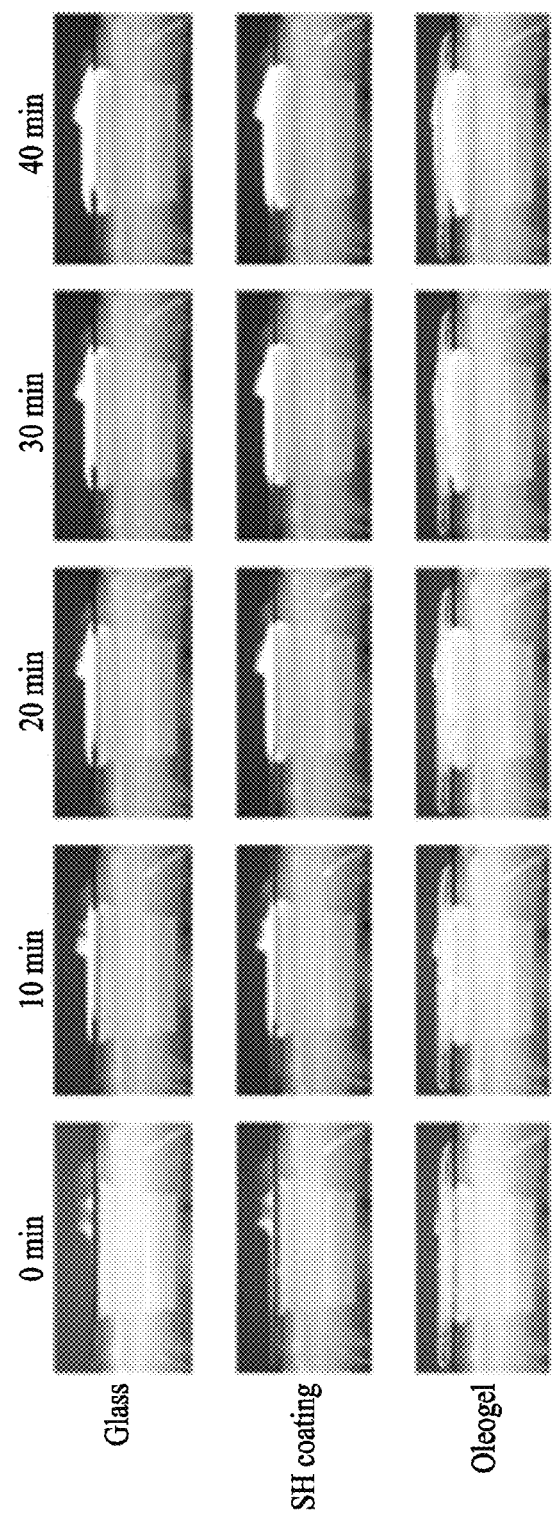
FIG. 5C, according to an example embodiment of the present invention, shows results of evaluating the anti-icing and de-icing performance of the fatty acid amide-based oleogel containing polymer according to an Example of the present invention.
Figure 5D:
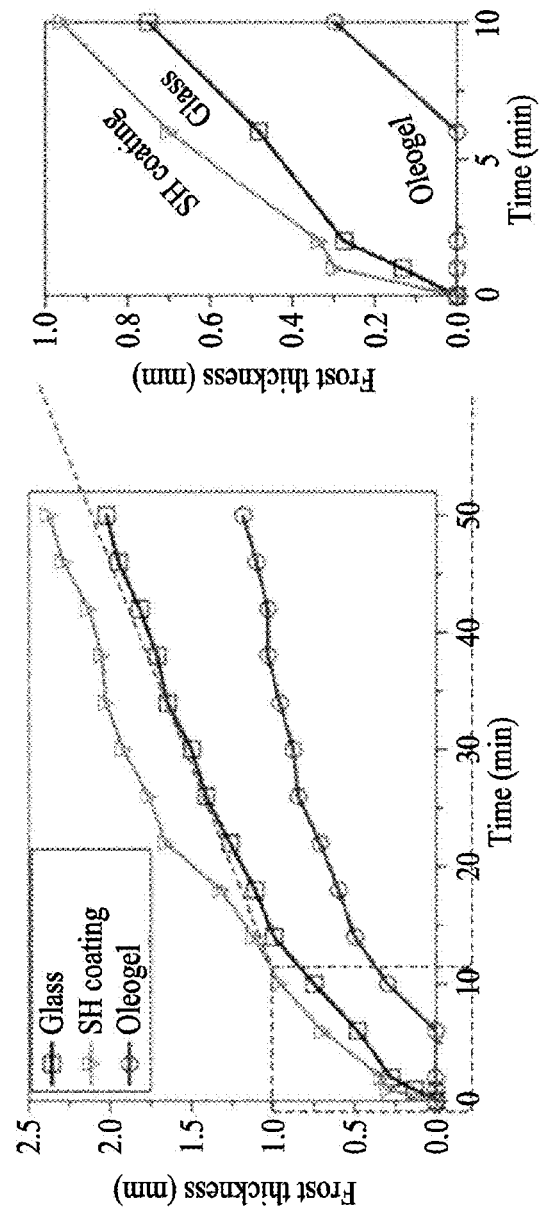
FIG. 5D, according to an example embodiment of the present invention, shows results of evaluating the anti-icing and de-icing performance of the fatty acid amide-based oleogel containing polymer according to an Example of the present invention.

In FIGS. 5D and 5C, the thickness of the formed frost was analyzed by taking the portion where the frost built up thickest in the images acquired over time as the test line and measuring the pixel intensity. As a result of the analysis, in the case of the oleogel surface based on a fatty acid amide-containing polymer, the frost formation rate was the slowest, and the thickness of the finally formed frost was also about 2.5 times thinner than that of other surfaces. In the case of the flat glass and superhydrophobic surface, there was no significant difference in frost thickness, this is because the frost prevention performance due to the difference in surface wettability did not show a significant difference. Looking at the initial stage of frost formation in FIG. 5D, it can be seen that frost begins to form immediately on the flat glass and superhydrophobic surface, whereas in the case of the oleogel surface, frost formation in delayed by about 6 minutes. These anti-icing properties also facilitate the de-icing process on the frozen surface.

Experimental Example 5

Evaluation of Antibiofouling Performance of Oleogel Based on Fatty Acid Amide-Containing Polymer

Figure 6:
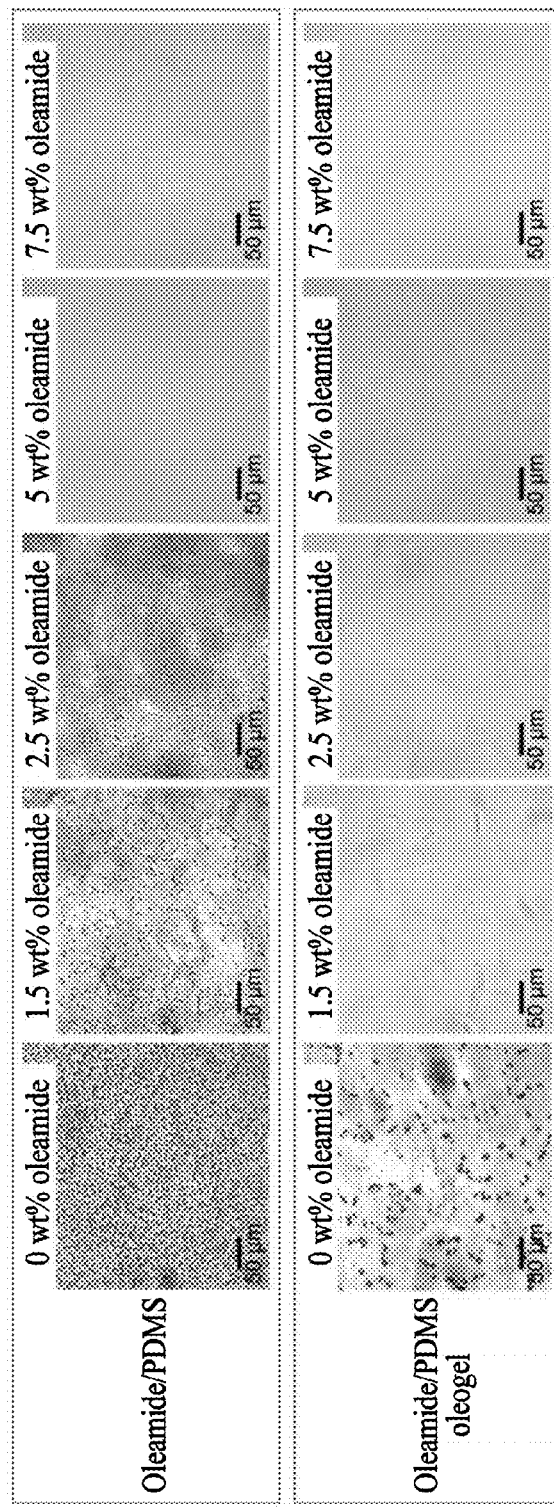
FIG. 6, according to an example embodiment of the present invention, shows results of evaluating the antibiofouling performance of the fatty acid amide-based oleogel containing polymer according to an Example of the present invention.

*Escherichia coli* (*E. Coli*) was cultured on the surface in order to evaluate the antibiofouling performance, which is a function of preventing underwater creatures from adhering to the surface of an object having a fatty acid amide-based oleogel applied thereto. First, the antibiofouling performance of the oleamide surface prepared with different weight percentages of oleamide in the oleamide/PDMS polymer was evaluated. The results are shown in FIG. 6. In FIG. 6, a large amount of E. coli was attached to the PDMS surface free from oleamide, but as the content of oleamide increased, the number of E. coli attached to the surface decreased. When the content of oleamide was 5% by weight or more, there was no E. coli attached to the surface. This seems to be because the oleamide material itself has a high antibiofouling performance. Further, the number of attached E. coli was remarkably lower on the oleogel (oleamide/PDMS oleogel) surface based on a fatty acid amide-containing polymer compared to the oleamide/PDMS polymer surface. That is, it appears that the fatty acid amide polymer-based oleogel has high antibiofouling performance due to its elasticity and very low surface energy properties. In particular, it can be confirmed that E. coli does not exist even on the surface with a small content of oleamide.

Although the example embodiments have been described with reference to the limited Examples and drawings as described above, various modifications and variations are possible from the above description by one of ordinary skill in the art. For example, appropriate results can be achieved although described techniques are performed in order different from a described method, and/or described elements are joined or combined in a form different from the described method, or replaced or substituted by other elements or equivalents. Therefore, other example embodiments, other Examples, and equivalents to the scope of claims also belong to the scope of the claims to be described later.

The invention claimed is:

1. A fatty acid amide-based oleogel containing polymer, the oleogel comprising: a matrix formed of a polymer of a fatty acid amide having one double bond represented by Chemical Formula 1 below and a silicone polymer, or a composition including the polymer; and an oleogel surface formed by impregnating a lubricating oil into the matrix, wherein the silicone polymer includes: a first polydialkylsiloxane terminated with a silyl group; and a second polydialkylsiloxane terminated with a vinyl group which are crosslinked, the fatty acid amide is linked to the first polydialkylsiloxane terminated with the silyl group, and the fatty acid amide is linked by hydrosilylation between a silicone hydride of the first polydialkylsiloxane and the double bond of the fatty acid amide:

[Chemical Formula 1]

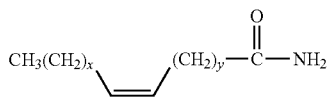

(where, X and Y are each selected from 1 to 100).

2. The oleogel of claim 1, wherein the oil is one which is impregnated into the surface of the matrix, inside the matrix, or both thereof.

3. The oleogel of claim 1, wherein the oil is impregnated in an amount of 1% by weight to 200% by weight based on the polymer of the fatty acid amide and the silicone polymer.

4. The oleogel of claim 1, wherein the silicone polymers are linked to each other by hydrosilylation between another silicone hydride of the first polydialkylsiloxane and the vinyl group of the second polydialkylsiloxane.

5. The oleogel of claim 1, wherein, in the first polydialkylsiloxane and the second polydialkylsiloxane, a silicone atom of the siloxane is substituted with an alkyl group having 1 to 5 carbon atoms.

6. The oleogel of claim 1, wherein the first polydialkylsiloxane and the second polydialkylsiloxane are polydimethylsiloxane.

7. The oleogel of claim 1, wherein the silicone polymer and the fatty acid amide have a polymerization ratio (w/w) in the range of 5:1 to 100:1.

8. The oleogel of claim 1, wherein the matrix is in a form of film, sheet, or coating, and the matrix is a slippery oleogel surface formed by impregnation with the oil.

9. The oleogel of claim 1, wherein the oil includes silicone oil, petroleum, or both thereof, and the petroleum includes one or more selected from the group consisting of crude oil, gasoline, diesel, and n-alkanes.

10. A coating comprising the fatty acid amide-based oleogel containing polymer of claim 1.

11. The coating of claim 10, wherein the coating has an oleogel surface layer having slippage properties, and the coating has waterproof and oilproof performance.

12. The coating of claim 10, wherein the coating has anti-icing and de-icing performance.

13. The coating of claim 10, wherein the coating has antibiofouling performance, friction drag reduction, and self-healing performance.

14. A method for preparing a fatty acid amide-based oleogel containing polymer, the method comprising steps of:
forming a matrix of a polymer of a fatty acid amide having one double bond represented by Chemical Formula 1 below and a silicone polymer, or a composition including the polymer; and
forming an oleogel by impregnating a lubricating oil into the matrix,
wherein the silicone polymer includes: a first polydialkylsiloxane terminated with a silyl group; and a second polydialkylsiloxane terminated with a vinyl group which are crosslinked, the fatty acid amide is linked to the first polydialkylsiloxane terminated with the silyl group, and the fatty acid amide is linked by hydrosilylation between a silicone hydride of the first polydialkylsiloxane and the double bond of the fatty acid amide:

[Chemical Formula 1]

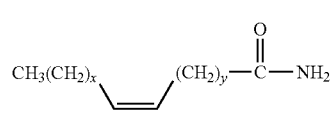

(where, X and Y are each selected from 1 to 100).

15. The method of claim 14, wherein the polymer comprised of the fatty acid amide and silicone polymer is one which is obtained by polymerizing: the fatty acid amide having one double bond represented by Chemical Formula 1 above, the first polydialkylsiloxane terminated with the silyl group; and the second polydialkylsiloxane terminated with the vinyl group under the presence of a catalyst.

* * * * *